United States Patent [19]
Hatley

[11] Patent Number: 6,069,473
[45] Date of Patent: May 30, 2000

[54] STATOR BAR JACKING DEVICE FOR MEASURING RADIAL MOVEMENT OF STATOR BAR USING AN LVDT

[75] Inventor: Kenneth J. Hatley, Madison, N.J.

[73] Assignee: General Electric Co., Schenectady, N.Y.

[21] Appl. No.: 09/046,562

[22] Filed: Mar. 24, 1998

[51] Int. Cl.[7] ................................................. G01B 7/14
[52] U.S. Cl. .................. 324/207.18; 324/220; 73/865.8; 33/558
[58] Field of Search ...................................... 324/219, 220, 324/226, 207.18, 207.19, 207.24, 262; 73/865.8, 865.9; 33/656, 555, 558, 558.4, 561, 827; 27/596, 597

[56] References Cited

U.S. PATENT DOCUMENTS 5,020,234   6/1991   Alkrie et al. ........................ 324/207.18

FOREIGN PATENT DOCUMENTS 34 38 468   6/1985   Germany .

*Primary Examiner*—Walter E. Snow
*Attorney, Agent, or Firm*—Nixon & Vanderhye

[57] ABSTRACT

A pneumatic jacking device is used to measure radial movement of stator bars in their slots while the generator is in-situ. The jacking device is designed to pass through the radial gap between the field retaining ring and stator end winding, requiring a minimum entrance gap of 2.625". The device is placed between the retaining ring and the stator bar, and radial movement is measured by the application of a force such as by a pneumatic ram or the like. Radial movement is measured by a linear voltage displacement transducer and is transmitted to a measuring unit for further processing.

9 Claims, 3 Drawing Sheets

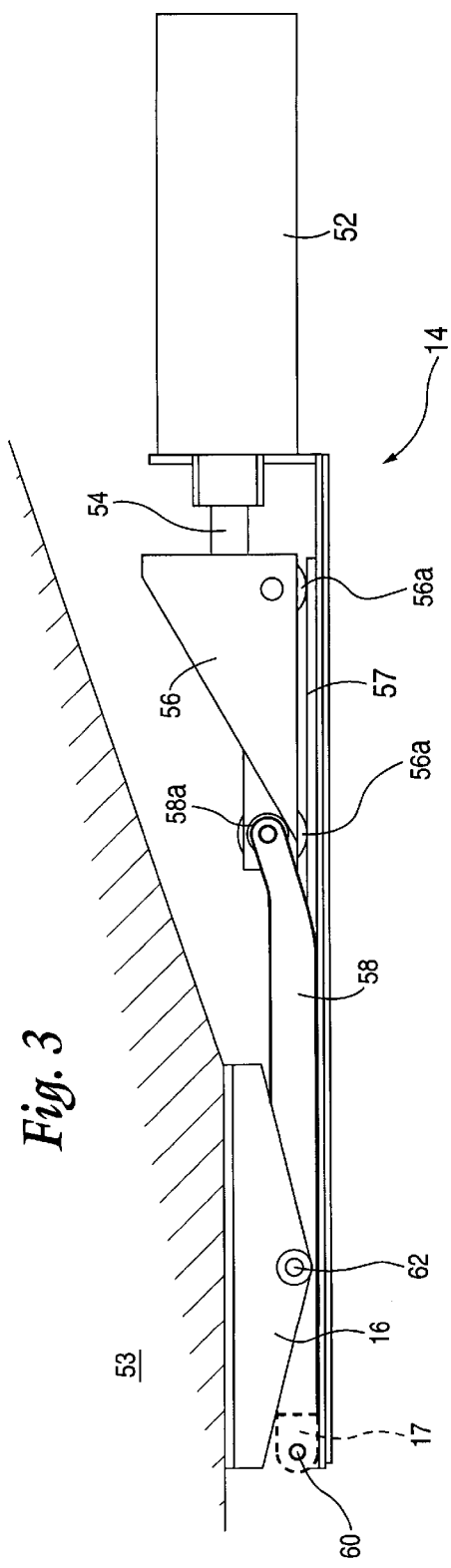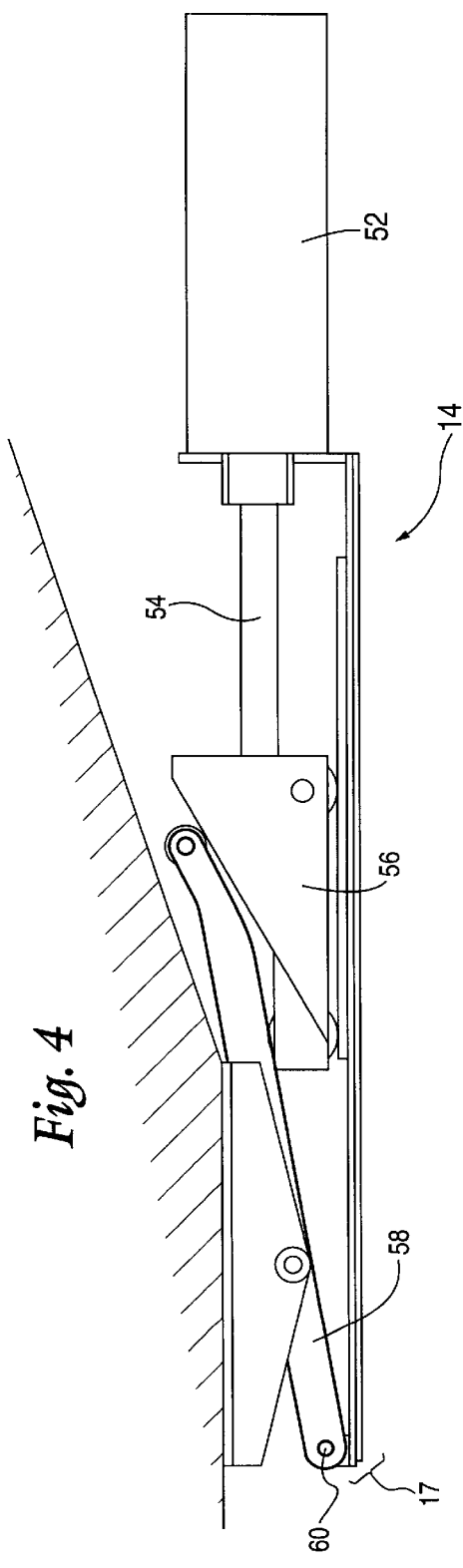

6,069,473

STATOR BAR JACKING DEVICE FOR MEASURING RADIAL MOVEMENT OF STATOR BAR USING AN LVDT

FIELD OF THE INVENTION

The invention relates to a stator bar jacking device and, more particularly, to a pneumatic jacking device used for measuring radial movement of stator bars in their slots while the generator is in-situ.

BACKGROUND

It has been determined that stator bar vibration, enabled by the radial clearance between the bar and stator slot, is a significant factor contributing to stator bar abrasion. The stator winding is designed and built with zero clearance in the slot. However, as a result of gradual shrinking of the slot contents such as bar armor, slot fillers and wedges, which can occur on a stator winding during normal, long-term operation, radial clearance develops in the stator slot. Early detection of the development of this clearance will enable generator owners to plan necessary corrective action before significant damage is done to the stator bar ground insulation due to bar abrasion. Thus, the jacking device will lend itself as a generator maintenance planning tool to identify parts and work scope for major maintenance outages.

The methodology used presently to measure the radial movement of the stator bar in the slot requires removal of the generator field from the stator. The cost of disassembly and removal of the field, the time it takes for this process, and the dangers of field removal have led to the omission of the radial movement measurement from outage schedules. A hydraulic jack with special jacking boards is typically used to push one stator bar against the radially opposite bar, and the movement is measured with a dial indicator.

DISCLOSURE OF THE INVENTION

The barjacking device according to the present invention enables this measurement to be made with minimal disassembly of the generator during a minor inspection outage and enables the gathering of valuable information to plan work scope and parts for a major inspection outage.

The jacking device is designed to pass through the radial gap between the field retaining ring and stator end winding. It requires a minimum entrance gap of 2.625". The device is delivered to the subject location where movement is to be measured by a miniature crawler, which is configured for circumferential positioning of the device about the retaining ring. The device is placed between the retaining ring and the stator bar to be measured by the application of force driven by air pressure or the like. The location where the stator bar movement will be measured is typically the straight portion of the radially inboard stator bar at the exit from the slot. The air pressure is regulated to apply a force of 100 pounds per inch length of contact between the device and the bar. The radial movement of the bar resulting from the application of this force is measured by a linear voltage displacement transducer (LVDT) and transmitted to a measuring unit.

In accordance with one aspect of the invention, there is provided a barjacking test unit for measuring radial movement of generator stator bars in-situ. The barjacking test unit includes an LVDT secured to a frame, the LVDT including a spring biased displacement measuring element. A bar sensor is engageable at an exterior end with a stator bar. A pivot bracket is pivotally secured to the frame and disposed between an interior end of the bar sensor and the spring biased displacement measuring arm of the LVDT. The spring biased displacement measuring arm urges the bar sensor toward engagement with the stator bar.

In accordance with another aspect of the invention, there is provided a barjacking crawler for measuring radial movement of generator stator bars in-situ. The barjacking crawler includes a jacking assembly insertable into a radial gap between a field retaining ring and a stator end winding of a generator. A barjacking test head is attached to the jacking assembly, and the barjacking test unit is cooperatively engaged with the barjacking test head.

BRIEF DESCRIPTION OF THE DRAWINGS

These and other aspects and advantages of the present invention will be described in detail with reference to the accompanying drawings, in which:

FIG. 3 is a side view of the barjacking crawler in a ready state; and

FIG. 4 is a side view of the barjacking crawler upon the application of force.

BEST MODE FOR CARRYING OUT THE INVENTION

Figure 1:
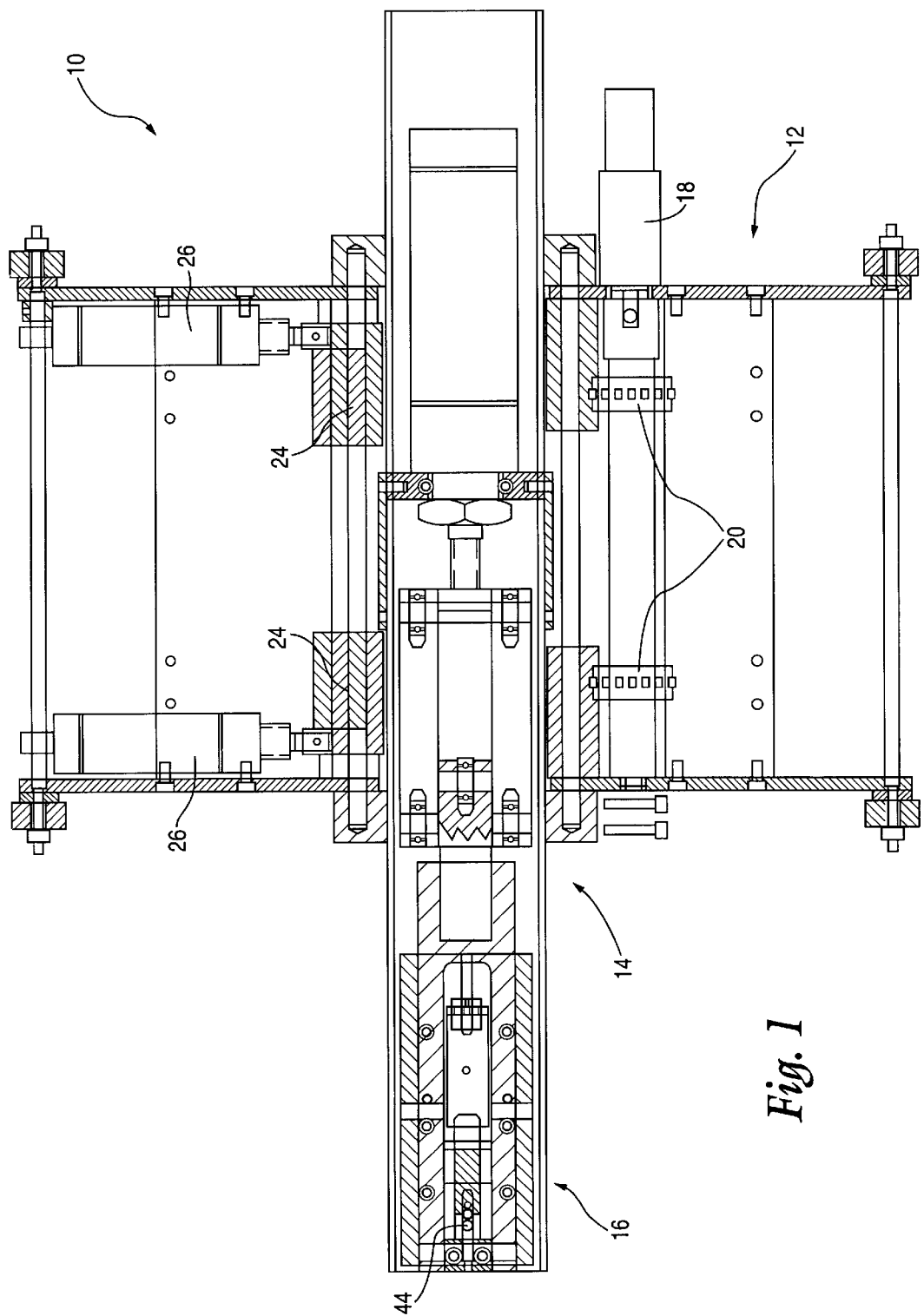
FIG. 1 is a top plan view of a barjacking crawler according to the present invention.

FIG. 1 is a top plan view of the barjacking crawler 10 according to the present invention. The crawler 10 primarily includes a tractor section 12 for circumferentially positioning a barjacking test head 17 and jacking assembly 14 about the generator field. The jacking assembly 14 cooperates with the barjacking test head 17 that is engaged with a barjacking test unit 18 (FIG. 2).

The tractor section 12 uses a DC motor 18 that transfers power to two joined drive gears 20. The drive gears 20 roll along tracks in a circumferential direction around the retaining ring. Slack in the drive tracks is removed by routing the tracks over to idle pulleys 24, respectively. The pulleys 24 are positioned at the end of two pneumatic air rams 26, respectively, which are activated via pressurized air, and the rams 26 push the pulleys 24 against the tracks.

Figure 2:
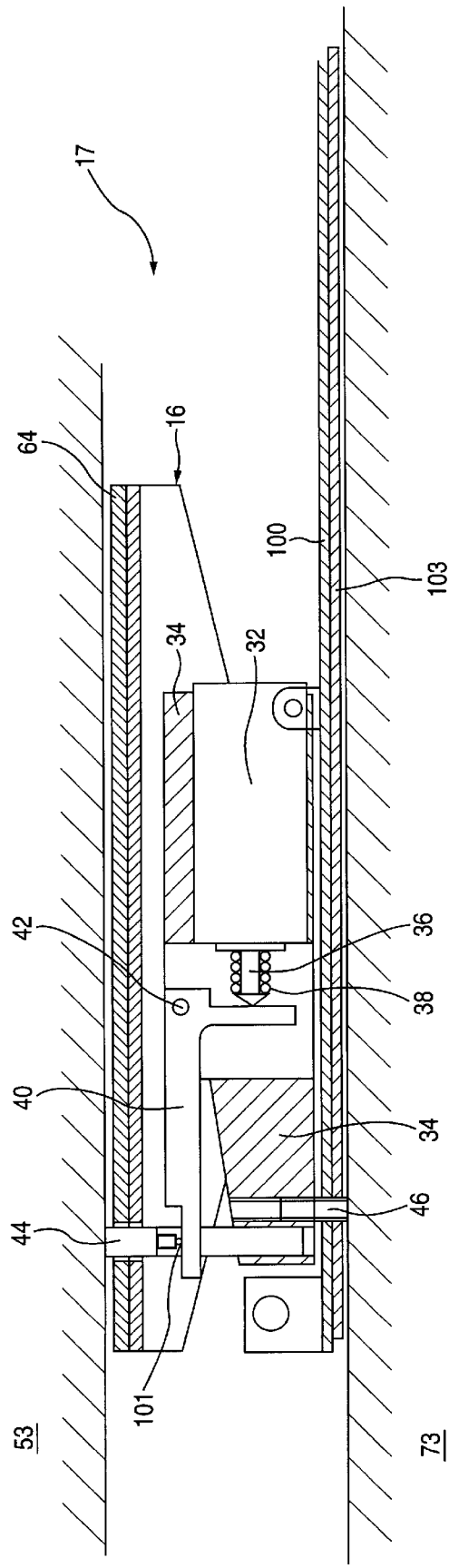
FIG. 2 is a cross-sectional view of the barjacking test unit according to the present invention.

Referring to FIG. 2, the barjacking test unit 17 is cooperatively engaged with the barjacking test head 16, which is attached to the jacking assembly 14 and positioned between the stator bar 53 and the retaining ring 73. The barjacking test unit 17 includes a linear voltage displacement transducer (LVDT) 32 secured to a frame 34. An LVDT is a conventional device for accurately measuring small distances. In his context, the LVDT 32 includes a spring biased displacement measuring arm 36 that is biased outward by a compression spring 38 disposed over the spring biased displacement measuring arm 36. The LVDT communicates with a measuring control unit (not shown) to process the measured distances.

The displacement measuring arm 36 engages a pivot bracket 40, which is attached to the frame 34 and pivots about a pivot 42. A bar sensor 44 is attached at an opposite end to a cross pin 101 of the pivot bracket 40 and is urged (upward in FIG. 2) toward engagement with the generator stator bar 53. As shown in FIG. 2, the bar sensor 44 extends through the barjacking test head 16 to engage the generator stator bar 53. A compliant pad 64 is provided on an upper surface of the barjacking test head 16 to minimize localized stressing of the insulation material covering the bar. The compliant pad 64 is preferably formed of high-density polyethylene (HDPE) for this purpose. Of course, other materials may be used such as urethane, and the invention is not meant o be limited to HDPE.

The frame 34 is pivotally mounted to a barjacking chassis 100. A retaining ring sensor 46 is secured to the frame 34 and extends through a hole in the chassis 100 into engagement with the retaining ring 73. The sensor 46 is kept in engagement with the retaining ring by virtue of the pivotal mounting of the frame 34 to the chassis 100. The bottom surface of the chassis 100 is coated with a wear plate 103, which is preferably manufactured from HDPE or other similar materials that will not scratch the retaining ring.

Referring to FIGS. 3 and 4, the jacking assembly 14 includes a wedge driver 52 such as a pneumatic ram including a driving piston 54. A wedge 56 is coupled with the driving piston and includes wheels 56a riding on a steel plate 57 to facilitate positioning and driving of the wedge 56. A lifting arm 58 is movably engaged at a first end with the wedge 56 for example by a wheel 58a, and is fixed at a second end at a pivot 60. The lifting arm 58 supports the barjacking test head 16 at an intermediate portion such as pivot 62 between the first and second ends.

As shown in FIG. 4, as the wedge driver 52 drives the wedge 56 via the piston 54 toward the barjacking test head 16 (to the left in FIGS. 3 and 4), the wheel 58a of the lifting arm 58 is urged upward by the wedge 56, thereby raising the barjacking test head 16 correspondingly into the stator bar 53. The wedge driver is controlled to apply a predetermined amount of force to the bar. In preferred forms, the force is about 100 pounds per inch length of contact between the device and the bar. In practice, the movement of the wedge 56 is very small, since the acceptable movement of the bar is typically only a few thousandths of an inch. The actual allowable deflection varies from generator to generator. In one embodiment, the jacking force is determined by the air pressure applied to the wedge driver 52. In an alternative arrangement, a load sensor is inserted between the wedge 56 and the piston 54 so that a more direct determination of load may be made.

In practice, during operation, the compliant pad 64 presses against the bar 53. The compliant pad 64 in FIG. 2 is shown slightly separated from the bar 53 for purposes of illustration. In order to test the tightness of the bar 53, a load is applied to the bar by the jacking assembly 14. The reactive force of this load is taken by the retaining ring 73. The change in distance between the bar 53 and the retaining ring 73 is measured by the relative movement of the bar sensor 44 and the retaining ring sensor 46. As noted, the retaining ring sensor 46 is rigidly coupled to the frame 34, and the frame 34 is pivotally mounted to the barjacking chassis 100. This pivotal mounting ensures that the sensor 46, which protrudes through a hole in the chassis 100, maintains contact with the retaining ring 73. As the sensor 44 slides in the frame 34, it causes the pivot bracket 40 to rotate about its pivot 42. The spring 38 causes the displacement measuring arm 36 of the LVDT 32 to remain in contact with the pivot bracket 40. The distance measured by the sensors 44 and 46 are unaffected by the relative positions of the jacking assembly 14 and the barjacking chassis 100.

By virtue of the structure according to the invention, in-situ testing for radial movement of stator bars can be performed without disassembly of the generator field. The jacking device is circumferentially positioned about the field by a tractor section and inserted through the radial gap between the field retaining ring and stator end winding. If radial movement of the bar resulting from the application of force exceeds a threshold limit, further maintenance can be performed.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A barjacking test unit for measuring radial movement of generator stator bars in-situ, the barjacking test unit comprising:

a linear voltage displacement transducer (LVDT) secured to a frame, the LVDT including a spring biased displacement measuring arm;

a bar sensor engageable at an exterior end with a stator bar; and a pivot bracket pivotally secured to the frame and disposed between an interior end of the bar sensor and the spring biased displacement measuring arm of the LVDT, wherein the spring biased displacement measuring arm urges the bar sensor toward engagement with the stator bar via the pivot bracket.

2. A barjacking test unit according to claim 1, further comprising a retaining ring sensor secured to the frame and adapted to engage a generator retaining ring.

3. A barjacking crawler for measuring radial movement of generator stator bars in-situ, the barjacking crawler comprising:

a barjacking assembly insertable into a radial gap between a field retaining ring and a stator end winding of a generator;

a barjacking test head attached to the jacking assembly; and a barjacking test unit cooperatively engaged with the barjacking test head, the barjacking test unit comprising:

a linear voltage displacement transducer (LVDT) secured to a frame, the LVDT including a spring biased displacement measuring arm, a bar sensor engageable at an exterior end with a stator bar, and a pivot bracket pivotally secured to the frame and disposed between an interior end of the bar sensor and the spring biased displacement measuring arm of the LVDT, wherein the spring biased displacement measuring arm urges the bar sensor toward engagement with the stator bar via the pivot bracket.

4. A barjacking crawler according to claim 3, wherein the barjacking test unit further comprises a retaining ring sensor secured to the frame and adapted to engage a generator retaining ring.

5. A barjacking crawler according to claim 3, wherein the jacking assembly comprises:

a wedge driver including a driving piston;

a wedge attached to the driving piston; and a lifting arm having a first end movably engaged with the wedge and a second end fixed at a pivot, the lifting arm supporting the barjacking test head at an intermediate portion between the first and second ends.

6. A barjacking crawler according to claim 5, wherein the barjacking test unit is fixedly disposed adjacent the second end of the lifting arm, and wherein the bar sensor extends through an aperture in the barjacking test head.

7. A barjacking crawler according to claim 3, wherein the bar sensor extends through an aperture in the barjacking test head.

8. A barjacking crawler according to claim 3, further comprising a tractor attachable to the field retaining ring for selective circumferential positioning about a generator rotor, wherein the jacking assembly is attached to the tractor.

9. A barjacking crawler according to claim 3, wherein the barjacking test head comprises a compliant pad on a stator bar side of the barjacking test head.

\* \* \* \* \*